Aug. 20, 1968  D. L. FORD ET AL  3,398,286
RADIATION SENSITIVE EVAPORATIVE ANALYZER
Filed July 17, 1964  4 Sheets-Sheet 1

INVENTORS
DOUGLAS L. FORD
WILLIAM W. KENNARD
BY Maurice W. Ryan
ATTORNEY

INVENTORS
DOUGLAS L. FORD
WILLIAM W. KENNARD

ATTORNEY

INVENTORS
DOUGLAS L. FORD
WILLIAM W. KENNARD

ATTORNEY

INVENTORS
DOUGLAS L. FORD
WILLIAM W. KENNARD

Maurice W. Ryan
ATTORNEY

United States Patent Office 3,398,286
Patented Aug. 20, 1968

3,398,286
RADIATION SENSITIVE EVAPORATIVE ANALYZER
Douglas Lyons Ford, Waverly, near Sydney, New South Wales, and William Walter Kennard, Eastwood, near Sydney, New South Wales, Australia, assignors, by mesne assignments, to Union Carbide Corporation, a corporation of New York
Filed July 17, 1964, Ser. No. 383,430
Claims priority, application Australia, July 24, 1963, 33,406/63
12 Claims. (Cl. 250—218)

ABSTRACT OF THE DISCLOSURE

An analytical instrument for continuously measuring percent by volume concentration of non-volatile solute liquid suspended or dissolved in volatile solvent liquids. Liquid to be analyzed is atomized into a fog, passed to an evaporation zone, heated to drive off the volatile constituents and monitored with scattered light. The density of the fog, which is proportional to non-volatile constituent concentration, attenuates the amount of light (from a constant light source) impinging on a photocell which produces signals having amplitudes proportional to and representative of nonvolatile concentrations of interest. Signals from the photocell may be continuously recorded on a strip chart.

---

This invention relates to an instrument for the qualitative and quantitative detection of the presence of substances in solution or in suspension in a liquid stream.

Solvent streams bearing in solution one or more solutes which are less volatile than the solvent are frequently employed in the practice of chemistry. Processes and analytical techniques often involve a stream of variable constitution, where a solution of one concentration of solute may be followed by a solution grading into another concentration, or even solvent alone, to be followed by another wave of solution bearing a different solute. For example, in the elution processes of chromatography, discrete bands containing solutes emerge from the column, interspersed with bands of solvent.

The sampling and evaluation of such elution fractions may be very time consuming, and where colored indicators cannot be employed it is not easy to determine when a solute is emerging. It is extremely desirable to be able to distinguish eluent fractions consisitng only of solvent, and arrange the collection of solute containing fractions only. It is even more desirable to be able to operate a continuous fraction collecting device which operates to collect only solute bearing fractions and is activated to commence collecting by the detection of solute in the emerging fraction.

It is a purpose of the present invention to provide means of detecting relatively non-volatile substances dissolved or suspended in a liquid stream. It is a further purpose of the present invention to provide means for the quantitative determination of such substances in a liquid stream. Alternatively, the method of the invention may be applied to process control, so that the presence or absence of predefined levels of such substances in a liquid stream may activate variations of process operations, such as closing valves, altering temperatures, changing receivers, and the like.

According to this invention we provide for the qualitative and quantitative detection of the presence of relatively nonvolatile substances dissolved or suspended in a volatile liquid an instrument which consists of the combination of means for admitting a controlled flow of the liquid stream, means for projecting such flow of liquid in dispersed form to an evaporation zone where substantial evaporation of the volatile liquid is effected, thus releasing the non-volatile substance as a fog, and means for detecting the presence of the fog and/or variations in the intensity thereof in an examination zone.

The controlled flow of the liquid stream may be achieved in a variety of ways. Where the stream is small, the whole of it may be employed; but more generally it will be preferred to use only a proportion of the liquid stream, while the balance is collected or diverted to other purposes. To affect this, a sampling device will be arranged, such as a constant level weir which maintains a steady small head of liquid to feed the instrument. An additional flow control device may be added with the purpose of ensuring a steady feed to the instrument, since quantitative results require reduction to a minimum of all variations from a steady operating condition.

The steady feed from the main liquid stream is then passed to an element which will project said liquid in dispersed form toward an evaporation zone discussed hereinafter.

One form of projection employs an atomizer. The exact nature of the atomizer depends to some extent on the solvent being examined; but it must provide a fog in the examination zone. For instance, it is possible to use a gas stream operating through a spray nozzle. To ensure that the resultant fog is available for examination in the zone provided, guides such as conical and cylindrical shapes may be inserted to direct the fog; especially where the gas stream is the ultimate carrier of the fog, a controlled sweeping at least to the examination zone seems to have advantages. When desired, the gas stream may be allowed to induce the introduction of a secondary gas stream into the operative zone of the instrument with consequent variation in the development of the fog.

The evaporation of the more volatile solvent from the less volatile substances in the droplets leaving the atomizer is effected in a number of ways. A highly volatile solvent will be evaporated by a gas stream such as operates the atomizer nozzle, especially if the gas stream is preheated. For less volatile solvents there is provided an adjustable heating device in close association with the atomizer, and arranged so that contolled temperatures can be achieved in the operative zone of the instrument in reproducible fashion. If the presence of the heating device introduces a flammability hazard from the volatile solvent, inert gas blanketing may be employed. In some cases the use of an inert gas stream to operate the atomizer will suffice.

In some forms of the invention, guide tubes were constructed of stainless steel gauze of such dimensions that when an electric current of appropriate size was passed through the gauze, the gauze guide tube simultaneously behaved as a heating device to effect the required evaporation.

It is essential that a given steady stream of feed mixture of a given constitution should result in the production of a fog of uniform intensity, and especially so if quantitative results are desired.

The fog may be detected by visual means for qualitative purposes only, but it is an advantage of the present invention that instrumental means may be employed for detecting and recording the presence of fog and any variation in its intensity. It is possible, and in some cases desirable, to operate the evaporation means so that the solvent is almost, but not entirely, evaporated within the examination zone; in that event some fog is always present, and the introduction of a less volatile solute intensifies the fog.

In one form of the invention an optical means is employed to record the fog intensity. The fog examination zone is illuminated by one or more light sources, and the scattered light produced by the solute fog is detected by one or more photo-electric cells. In one form of the invention a spherical mirror was incorporated in the optical system to return the beam of light from the light source to the fog examination zone, thus allowing scattering by the fog particles of incident light from two opposing directions. The axis of the mirror-light source system was inclined at approximately 45° to the vertical axis of the instrument. The scattered light was collected at an angle of about 90° to the focussed beam of incident light, but a different angle might be used where convenient.

In another form, the incident light was directed normally to the vertical axis of the instrument, and the scattered light was examined in a direction approximately 145° from the incident light in the same horizontal plane (forward scattering).

In a third variation, two light sources were disposed in a horizontal plane at an angle of approximately 70° to each other, the incident light in each case being normal to the vertical axis of the instrument, and two photoelectric cell detectors were arranged to examine the forward scattering of light.

Where a gas stream is an integral part of the instrument, an exit for the gas and entrained fog must be provided, and with the small light source described hereinafter we have deemed it necessary to provide a light trap.

With the foregoing and other objects in view, which will be appreciated in reading the ensuing specification, the present invention will now be described with greater particularity and with reference to the appended drawings wherein similar parts bear the same numerical designation and FIGURE 1 is a schematic sectional view through an instrument according to the present invention;

*Example 1*

Figure 1:
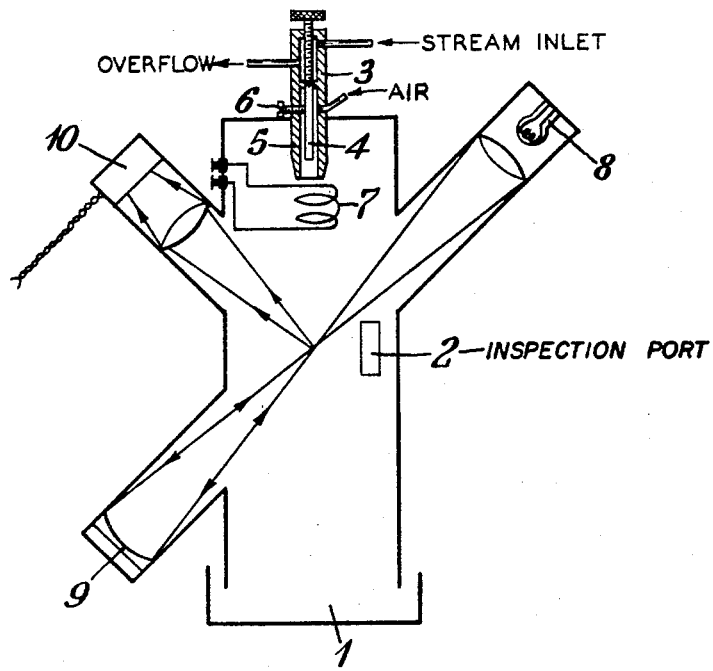

One form of the invention is built according to the following description, as illustrated by accompanying drawings (FIG. 1):

The instrument is constructed from standard sizes of stainless steel tubing coated inside with optical flat black paint. A light trap 1 on the lower (exhaust) end of the body is necessary to eliminate stray light and an inspection port 2 is provided in the region of the examination zone.

*Sampler.*—The sample stream is led into a small needle valve 3 which provides a small constant head of liquid above the seat through which a portion is fed directly to the atomizer through a 20 gauge hypodermic tube 4. Alternatively, steadier operation can be obtained using a fixed feed system consisting simply of a length of suitable diameter tubing.

*Atomizer.*—The 20 gauge exit tube from the sampler continues to carry the liquid feed to the atomizer 5. Air is introduced through an outer concentric nozzle drilled to 0.052 in. and reamed to a taper of 1 in 48. In operation, approximately 9 cu. ft./hour of air is used at 5 p.s.i.g. pressure. Three centering screws 6 allow positioning of the liquid feed tube. An adjustable heater 7 surrounds the stream jet just below the atomizer tip. Various guides of conical and cylindrical shape have been tried in the atomizer stream between jet and light beam with some improvement in stability of the fog. The air jet also serves to scavenge the entire body of the instrument by Venturi effect, thus preventing contamination of the optics.

Figure 8:
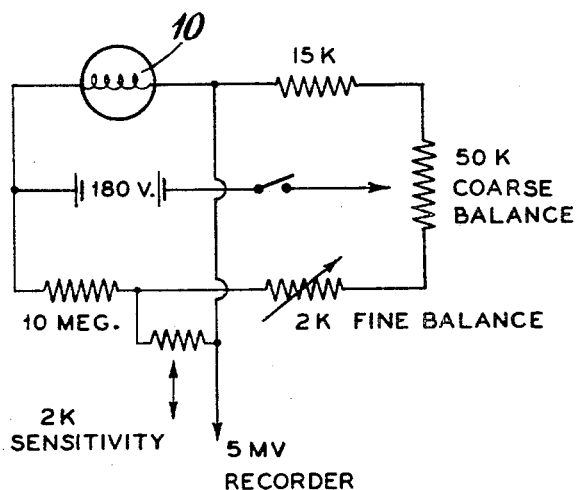

*Optics and detector.*—Light from a 6 volt 18 watt lamp 8 is focussed as in the diagram, the spherical mirror 9 serving as a light trap for the beam and reflecting incident light, thus producing scattering from two directions. Steadier operation is obtained if instead of focussing sharply, an area about ⅛–¼ in. wide is used in the working region. Light collected at 90° to the beam is focussed to a photoelectric cell 10, the output of which is fed through a simple bridge (see FIG. 8) to a 5 mv. recorder.

Tests have been carried out at sample feed rates of approx. 0.5 cc./min. (i.e. solvent+solute). Greater sensitivity can be achieved at higher feed rates, but for laboratory chromatographic applications the lowest practicable rate is desirable and the above is a compromise between useful sensitivity and low sample consumption.

With the equipment set up as described, using 0.5 cc./min. feed rate, a deflection of 5 mv. is obtained for a concentration of approx. 0.03% of paraffin or silicone oil in n-hexane at maximum sensitivity control setting, base line noise level being 0.1 mv. peak to peak. Concentration changes as low as 10 p.p.m. can be detected if sufficiently rapid, but for practical operation, between 30 and 50 p.p.m. would be the low limit.

Reducing the sensitivity to 0.5% solute for 5 mv. deflection gives a steady base line with practically undetectable noise level. Under these conditions the low limit of detection would be about 100 p.p.m.

Figure 7:
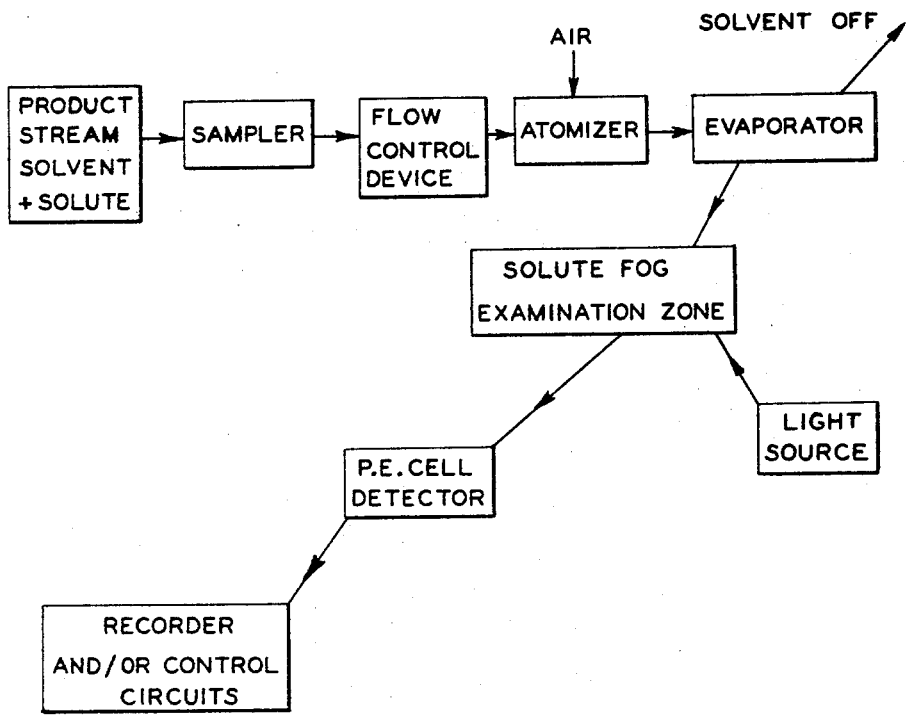
FIGURE 7 is a block diagram showing the elements of the invention schematically arranged with a product stream to be analyzed and ancillary recording and control componentry and FIGURE 8 is an electrical schematic diagram showing the manner of connection, through a conventional bridge circuit, of photo-electric cell 10 to a recorder impact.

The relation of the instrument described to a product stream containing solvent plus one or more solutes and ancillary recording and controlling circuits is shown schematically in the block diagram. (FIG. 7).

*Example 2*

Figure 2:
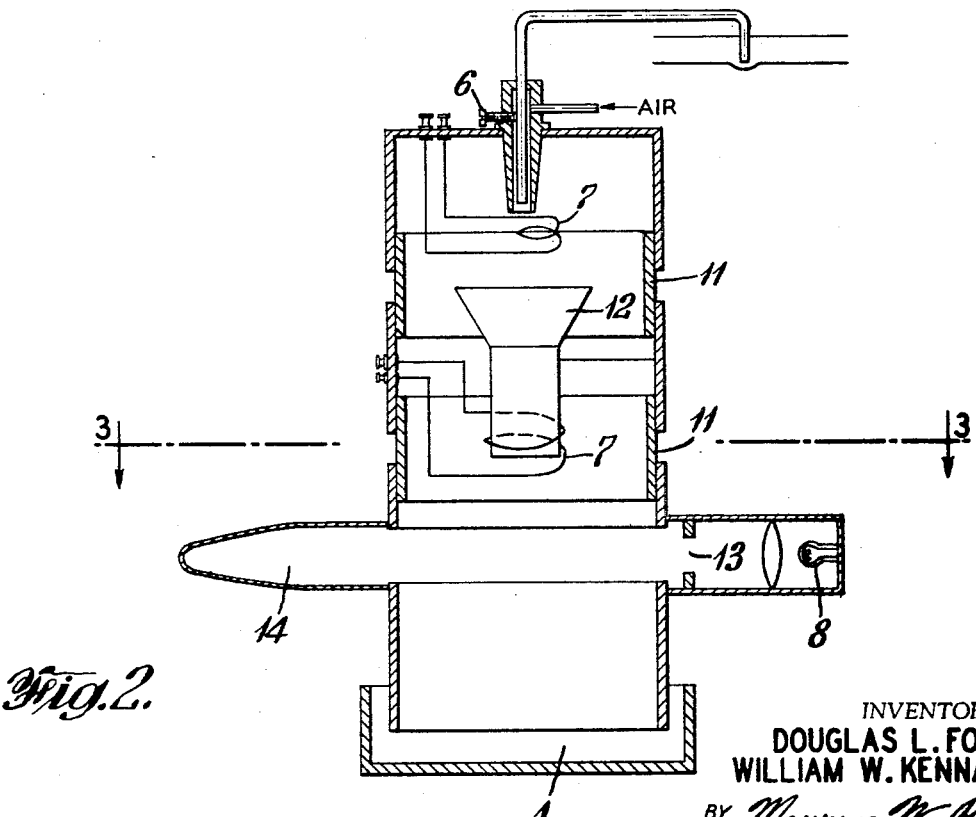
FIGURE 2 is a schematic sectional view through an alternative embodiment of apparatus according to the invention.
Figure 3:
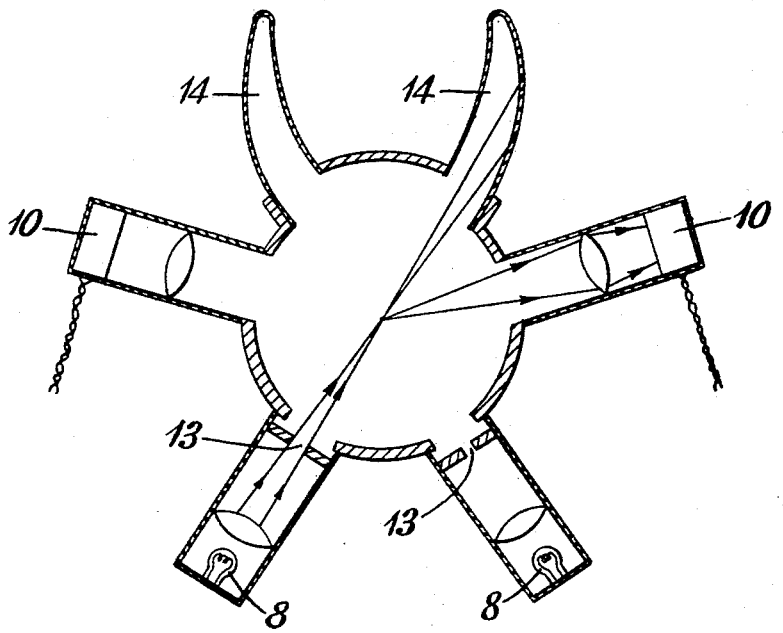
FIGURE 3 is another sectional view of the apparatus of FIGURE 2, taken along lines 3—3 of that figure.
Figure 4:
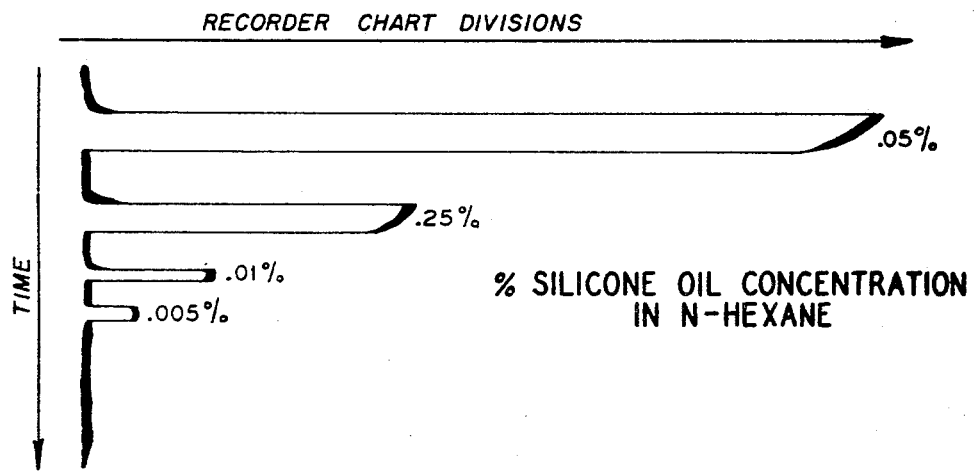
FIGURE 4 is a reproduction of a recorder trace produced with apparatus according to the present invention when successively increasing amounts of a silicone oil dissolved in n-hexane solvent were fed to the instrument.
Figure 5:
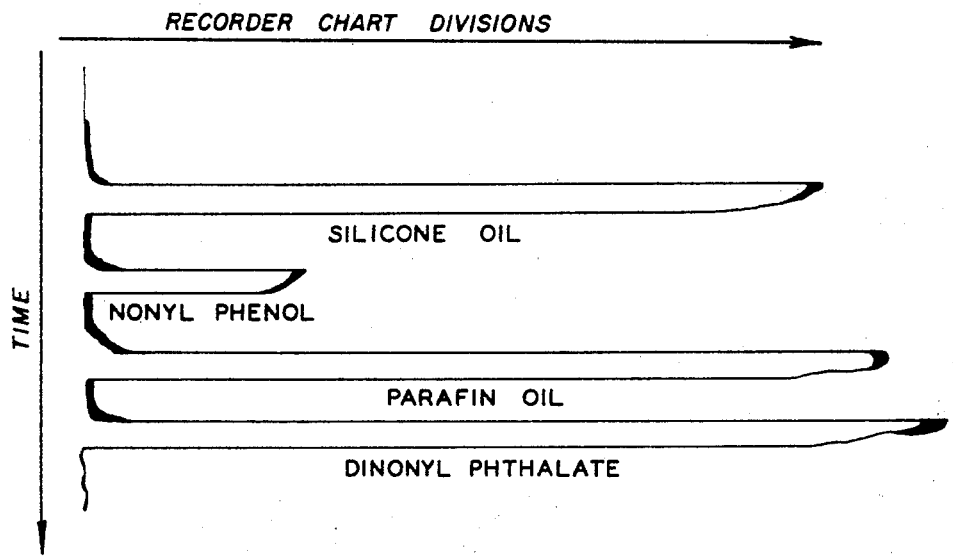
FIGURE 5 is a reproduction of a recorder trace produced with apparatus according to the present invention when a variety of solutes in n-hexane solvent were fed to the instrument.
Figure 6:
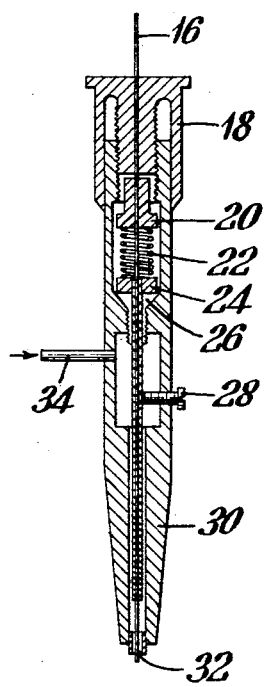
FIGURE 6 is a sectionalized view of an improved nozzle element according to the present invention.

A second form of the instrument using similar elements in a different spatial inter-relationship is illustrated in FIGS. 2 and 3. The optical system is duplicated, and lies in a horizontal plane normal to the vertical axis of the instrument. To add versatility to the instrument, a series of spacing rings 11 is incorporated which allow variation in the distance along the vertical axis between the atomizer and the evaporating zone, and between the evaporating zone and the examination zone. In this way, closer control of operation when employing liquid streams of different relative volatility can be achieved. The heating coils 7 were designed to allow operation at a red heat if desired, the maximum power input being of the order of 300 watts controllable by a variable auto transformer. A conical cylindrical guide piece 12 was inserted between the heating coils with some advantage in gaining stable operation.

Collimating slits 13 were provided in the optical trains.

This form of the instrument was much more sensitive; and in particular, care had to be exercised to preclude dust from the environment. As a further refinement, curved light traps 14 were placed diametrically opposite the light sources in the same horizontal plane, thus reducing variations in the response of the instrument which arose from variable reflection by the surfaces treated with optical black.

A number of variations of detail are possible without departing from the spirit of the present invention. For example, where a Venturi effect is present in the functioning of an atomizing nozzle, it is possible to use the resultant reduced pressure to siphon the liquid feed for the instrument from a small constant level weir or the like interposed in the main liquid stream. In one such arrangement, a capillary tube in the form of an inverted U was set up to constitute both siphon and inner jet for the atomizer. In another example a fine needle was set within the inner jet and caused to vibrate by mechanical or electromagnetic means to ensure more adequate dispersion and to ensure that the jet was not obstructed by deposited solute or the like material. Such a vibrating element associated with the inner jet is also believed to facilitate the handling of dispersions.

*Example 3*

Excellent reproducible results were obtained with an improved form of the inverted U capillary induction siphon feed. A 23 gauge capillary tube was mounted in the centre of an atomizing nozzle with vernier control of its position along the longitudinal axis, the other end of the tube being arranged to siphon the feed material form a constant level feed device. The vernier control allowed very careful adjustment of the volumes fed to the atomizing nozzle and, notwithstanding any prior variations of supply rate the return of the vernier control to a specified position, repeatedly gave reproducible electrical signals to the recording device. The detail of one form of nozzle fed in such fashion is shown in FIG. 6.

A 23 gauge tube 16 passes successively through a micrometer type vernier screw head 18, an actuating block 20 to which the tube is fixed, a compression spring 22 which bears against both the actuating block and a spacing block 24, a screwed holder 26 which carries fixed to it a tube combination consisting of a length of 20 gauge tube inside a length of 17 gauge tube, said tubes combination being aligned with the axis by three screws 28, and emergizing from the said tube continues along the axis of the nozzle barrel 30 to the aperture 32 which is defined by a short length of 17 gauge tube sweated into the reduced diameter of the nozzle barrel. An inlet for air or other operating gas is provided at 34.

FIG. 4 shows the response of the recorder when successively increasing amounts of a silicone oil dissolved in n-hexane were fed to the instrument in place of n-hexane alone which established the base line. It will be observed that the peak height is substantially proportional to the concentration of solute.

FIG. 5 shows the response of the recorder when a variety of solutes were fed in succession to the instrument, n-hexane in each case being the solvent.

In the results shown graphically in FIGS. 4 and 5 it will be appreciated that when solute is no longer present, the instrument reverts to a stable base line recording in a fashion eminently desirable for quantitative results.

Useful electrical signals to the recording instruments were achieved showing the presence of the following types of solutes in the solvents indicated.

Silicone oil in carbon tetrachloride.
Water in acetone.

Nonylphenol in benzene.
Dinonyl phthalate in glacial acetic acid.
Silicone oil in cyclohexane.
Suspension of cosmetic oil in hexane.

The foregoing disclosure is intended to be illustrative and descriptive of the present invention and is not to be taken in a limiting sense, it being intended to define the invention in accordance with the claims appended hereto.

What is claimed is:

1. An instrument for qualitative and quantitative detection of the presence of a relatively non-volatile solute substance combined in a volatile liquid stream comprising, in combination, means for admitting a controlled flow of said liquid stream into said instrument; means for projecting said liquid stream in dispersed form from a dispersing zone into an evaporation zone where substantial evaporation of the volatile liquid is effected by at least one heating element adjacent the evaporation zones, thus releasing the non-volatile solute substance as a fog; and radiation sensitive means for detecting the presence of said fog and variations in the intensity thereof in an examination zone which is physically connected to said evaporation zone.

2. An instrument for qualitative and quantitative detection of the presence of a relatively non-volatile solute substance combined in a volatile liquid stream comprising, in combination, means for admitting a controlled flow of said liquid stream into said instrument; gas operated means for aspirating and dispersing said flow and projecting dispersed liquid from a dispersing zone to an evaporation zone where substantial evaporation of the volatile liquid is effected by at least one heating element adjacent the dispersing and evaporation zones, thus releasing the non-volatile solute substance as a fog; and radiation sensitive means for detecting the presence of said fog and variations in the intensity thereof in n examination zone which is physically connected to said evaporation zone.

3. An instrument according to claim 1 including visual means arranged and disposed in said instrument to allow observation of said fog in said examination zone.

4. An instrument according to claim 2 including visual means arranged and disposed in said instrument to allow observation of said fog in said examination zone.

5. An instrument according to claim 1 wherein said means for detecting the presence of said fog and variations in the intensity thereof comprises, in combination, a light source; light beam focusing means adjacent said light source; and a photo-electric cell arranged and disposed to produce output signals representative of and proportional to intensity of incident light impinging thereon from said fog in said examination zone.

6. An instrument according to claim 2 wherein said means for detecting the presence of said fog and variations in the intensity thereof comprises, in combination, a light source; light beam focusing means adjacent said light source; and a photo-electric cell arranged and disposed to produce output signals representative of and proportional to intensity of incident light impinging thereon from said fog in said examination zone.

7. An instrument according to claim 1 wherein said means for detecting the presence of said fog and variations in the intensity thereof comprises, in combination, a light source; light beam focusing means adjacent said light source; a collimating slit adjacent said light beam focusing means; and a photo-electric cell arranged and disposed to produce output signals representative of and proportional to intensity of incident light impinging thereon from said fog in said examination zone.

8. An instrument according to claim 2 wherein said means for detecting the presence of said fog and variations in the intensity thereof comprises, in combination, a light source; light beam focusing means adjacent said light source; a collimating slit adjacent said light beam focusing means; and a photo-electric cell arranged and disposed to produce output signals representative of and proportional to intensity of incident light impinging thereon from said fog in said examination zone.

9. An instrument according to claim 5 wherein said photo-electric cell is operably connected to signal recording means through an electrical bridge circuit.

10. An instrument according to claim 6 wherein said photo-electric cell is operably connected to signal recording means through an electrical bridge circuit.

11. An instrument according to claim 7 wherein said photo-electric cell is operably connected to signal recording means through an electrical bridge circuit.

12. An instrument according to claim 8 wherein said photo-electric cell is operably connected to signal recording means through an electrical bridge circuit.

References Cited

UNITED STATES PATENTS

| | | | |
|---|---|---|---|
| 2,346,690 | 4/1944 | Larkins | 250—218 X |
| 2,736,813 | 2/1956 | Cherrier | 250—210 X |
| 2,876,364 | 3/1959 | Goody | 88—14 |
| 3,150,264 | 9/1964 | Ehlert | 250—210 X |

WALTER STOLWEIN, *Primary Examiner.*

UNITED STATES PATENT OFFICE
CERTIFICATE OF CORRECTION

Patent No. 3,398,286                                  August 20, 1968

Douglas Lyons Ford et al.

It is certified that error appears in the above identified patent and that said Letters Patent are hereby corrected as shown below:

Column 6, line 18, after "the" insert -- dispersing and --; line 36, "n" should read -- an --.

Signed and sealed this 20th day of January 1970.

(SEAL)
Attest:

Edward M. Fletcher, Jr.                          WILLIAM E. SCHUYLER, JR.
Attesting Officer                                      Commissioner of Patents